US012657724B2

(12) United States Patent
Contijoch et al.

(10) Patent No.: US 12,657,724 B2
(45) Date of Patent: Jun. 16, 2026

(54) DEEP LEARNING CARDIAC SEGMENTATION AND MOTION VISUALIZATION

(71) Applicant: The Regents of the University of California, Oakland, CA (US)

(72) Inventors: Francisco Contijoch, San Diego, CA (US); Zhennong Chen, San Diego, CA (US); Davis Vigneault, Palo Alto, CA (US); Marzia Rigolli, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 659 days.

(21) Appl. No.: 18/006,145

(22) PCT Filed: Jul. 20, 2021

(86) PCT No.: PCT/US2021/042438
§ 371 (c)(1),
(2) Date: Jan. 19, 2023

(87) PCT Pub. No.: WO2022/020394
PCT Pub. Date: Jan. 27, 2022

(65) Prior Publication Data
US 2023/0289972 A1 Sep. 14, 2023

Related U.S. Application Data

(60) Provisional application No. 63/054,196, filed on Jul. 20, 2020.

(51) Int. Cl.
*A61B 5/026* (2006.01)
*G06N 3/0455* (2023.01)
(Continued)

(52) U.S. Cl.
CPC .............. *G06T 7/11* (2017.01); *G06T 7/0012* (2013.01); *G06T 7/174* (2017.01);
(Continued)

(58) Field of Classification Search
USPC ...... 128/900–925; 382/100–225; 704/1–275; 706/1–60
See application file for complete search history.

(56) References Cited

U.S. PATENT DOCUMENTS 9,968,257 B1 * 5/2018 Burt ..................... A61B 5/0044
10,117,597 B2 * 11/2018 Beckers ................. A61B 5/055
(Continued)

OTHER PUBLICATIONS

Devito Raymond P; Automatic Identification of the Long Axis of the Left Ventricle From Nuclear Medicine Spect Data for use in Myocardial Perfusion Studies; 1994 (Year: 1994).*
(Continued)

Primary Examiner — Marcellus J Augustin
(74) Attorney, Agent, or Firm — Perkins Coie LLP

(57) ABSTRACT

Devices, systems, and methods for automated segmentation and slicing of cardiac computed tomography (CT) images are described. An example method includes receiving a first plurality of input image frames associated with a cardiac CT operation, each of the first plurality of input image frames comprising a representation of two or more chambers of a heart, and performing, using a convolutional neural network, a segmentation operation and a slicing operation on each of the first plurality of input image frames to generate each of a plurality of output image frames comprising results of the segmentation operation and the slicing operation, wherein the segmentation operation comprises identifying volumes of each of the two or more chambers of the heart based on blood volumes, wherein the slicing operation comprises identifying one or more features of the heart in at least one
(Continued)

predefined plane in a coordinate system associated with the cardiac CT operation.

17 Claims, 12 Drawing Sheets

(51) Int. Cl.

| | |
|---|---|
| *G06N 3/0464* | (2023.01) |
| *G06T 7/00* | (2017.01) |
| *G06T 7/11* | (2017.01) |
| *G06T 7/174* | (2017.01) |
| *G06T 17/00* | (2006.01) |

(52) U.S. Cl.
CPC .............. *G06T 2207/10081* (2013.01); *G06T 2207/20084* (2013.01); *G06T 2207/30048* (2013.01)

(56) References Cited

U.S. PATENT DOCUMENTS

| | | | | |
|---|---|---|---|---|
| 10,580,131 | B2 * | 3/2020 | Mazo | G06N 3/08 |
| 10,869,608 | B2 * | 12/2020 | Dormer | A61B 5/0263 |
| 2014/0071125 | A1 * | 3/2014 | Burlina | G06T 17/00 345/420 |
| 2019/0088359 | A1 * | 3/2019 | Moore | G16H 30/20 |
| 2019/0279361 | A1 * | 9/2019 | Meyer | A61B 5/7267 |
| 2020/0093464 | A1 * | 3/2020 | Martins | A61B 8/12 |

OTHER PUBLICATIONS

International Search Report and Written Opinion from PCT Appl. Ser. No. PCT/US2021/042438 mailed Oct. 29, 2021, 22 pages.

Al-Khatib, et al., "2017 AHA/ACC/HRS Guideline for Management of Patients With Ventricular Arrhythmias and the Prevention of Sudden Cardiac Death: Executive Summary", Circulation. 2018; 138(13): e210-e271. doi: 10.1161/CIR.0000000000000548, 62 pages.

Blansit, et al., "Deep Learning-based Prescription of Cardiac MRI Planes", Radiol Artif Intell. 2019;1(6):e180069. doi:10.1148/ryai. 2019180069, 8 pages.

Cerqueira, et al., "Standardized myocardial segmentation and nomenclature for tomographic imaging of the heart. A statement for healthcare professionals from the Cardiac Imaging Committee of the Council on Clinical Cardiology of the American Heart Association", Circulation. 2002; 105(4):539-542. doi:10.1161/hc0402. 102975, 4 pages.

Contijoch, et al., "A novel method for evaluating regional RV function in the adult congenital heart with low-dose CT and SQUEEZ processing", Int J Cardiol. 2017;249:461-466. doi: 10.1016/j.ijcard.2017.08.040, 13 pages.

Crum, et al., "Generalized Overlap Measures for Evaluation and Validation in Medical Image Analysis", IEEE Trans Med Imaging. 2006;25(11):1451-1461. doi:10.1109/TMI.2006.880587, 11 pages.

De Graaf, et al., "Assessment of global left ventricular function and volumes with 320-row multidetector computed tomography: A comparison with 2D-echocardiography", J Nucl Cardiol. 2010;17(2):225-231. doi:10.1007/s12350-009-9173-y, 7 pages.

Goette, et al., "EHRA/HRS/APHRS/SOLAECE expert consensus on atrial cardiomyopathies: definition, characterization, and clinical implication", Europace. 2016;18(10):1455-1490. doi:10.1093/europace/euw161, 36 pages.

Hoit, Briand. , "Left Atrial Size and Function", J Am Coll Cardiol. 2014;63(6):493-505. doi: 10.1016/j.jacc.2013.10.055, 13 pages.

Jaderberg, et al., "Spatial Transformer Networks", Jun. 2015. http://arxiv.org/abs/1506.02025., 15 pages.

Kramer, et al., "Standardized cardiovascular magnetic resonance imaging (CMR) protocols: 2020 update", J Cardiovasc Magn Reson. 2020;22(1):17. doi:10.1186/s12968-020-00607-1, 18 pages.

Kuhl, et al., "Assessment of left atrial volume and function: a comparative study between echocardiography, magnetic resonance imaging and multi slice computed tomography", Int J Cardiovasc Imaging. 2012;28(5):1061-1071. doi:10.1007/s10554-011-9930-2, 11 pages.

Le, et al., "Computationally Efficient Cardiac Views Projection Using 3D Convolutional Neural Networks", In: Cardoso MJ, Arbel T, Carneiro G, et al., eds. Deep Learning in Medical Image Analysis and Multimodal Learning for Clinical Decision Support. Cham: Springer International Publishing; 2017:109-116., 8 pages.

McVeigh, et al., "Regional myocardial strain measurements from 4DCT in patients with normal LV function", J Cardiovasc Comput Tomogr. May 2018. doi:10.1016/j.jcct.2018.05.002, 16 pages.

Messroghli, et al., "Assessment of Regional Left Ventricular Function: Accuracy and Reproducibility of Positioning Standard Short-Axis Sections in Cardiac MR Imaging", Radiology. 2005;235(1):229-236. doi:10.1148/radiol.2351040249, 8 pages.

Morris, et al., "CT and MR Imaging of the Mitral Valve: Radiologic-Pathologic Correlation", RadioGraphics. 2010;30(6): 1603-1620. doi:10.1148/rg.306105518, 19 pages.

Moss, et al., "Prophylactic Implantation of a Defibrillator in Patients with Myocardial Infarction and Reduced Ejection Fraction", N Engl J Med. 2002;346(12):877-883. doi:10.1056/NEJMoa013474, 7 pages.

Nishimura, et al., "2017 AHA/ACC Focused Update of the 2014 AHA/ACC Guideline for the Management of Patients With Valvular Heart Disease: A Report of the American College of Cardiology/American Heart Association Task Force on Clinical Practice Guidelines", J Am Coll Cardiol. 2017;70(2):252-289. doi:10.1016/j.jacc. 2017.03.011, 37 pages.

O'Brien, et al., "Anatomy of the Heart at Multidetector CT: What the Radiologist Needs to Know", RadioGraphics. 2007;27(6):1569-1582. doi:10.1148/rg.276065747, 17 pages.

Pourmorteza, et al., "A New Method for Cardiac Computed Tomography Regional Function Assessment", Circ Cardiovasc Imaging. 2012;5(2):243-250. doi:10.1161/CIRCIMAGING.111.970061, 8 pages.

Rigolli, et al., "Bias associated with left ventricular quantification by multimodality imaging: a systematic review and meta-analysis", Open Hear. 2016;3(1):e000388. doi:10.1136/openhrt-2015-000388, 16 pages.

Romero, et al., "Detection of left atrial appendage thrombus by cardiac computed tomography in patients with atrial fibrillation: A meta-analysis", Circ Cardiovasc Imaging. 2013;6(2):185-194. doi:10. 1161/CIRCIMAGING.112.000153, 10 pages.

Ronneberger, et al., "U-Net: Convolutional Networks for Biomedical Image Segmentation", In: Navab N, Hornegger J, Wells WM, Frangi AF, eds. Medical Image Computing and Computer-Assisted Intervention—MICCAI 2015. Cham: Springer International Publishing; 2015:234-241., 8 pages.

Soffer, et al., "Convolutional Neural Networks for Radiologic Images: A Radiologist's Guide", Radiology. 2019;290(3):590-606. doi:10.1148/radiol.2018180547, 17 pages.

Suinesiaputra, et al., "Quantification of LV function and mass by cardiovascular magnetic resonance: multi-center variability and consensus contours", J Cardiovasc Magn Reson. 2015; 17(1):63. doi:10.1186/s12968-015-0170-9, 8 pages.

Sutskever, et al., "On the Importance of Initialization and Momentum in Deep Learning", In: Proceedings of the 30th International Conference on International Conference on Machine Learning—vol. 28. ICML'13. JMLR.org; 2013:III-1139-III-1147, 9 pages.

Taylor, et al., "ACCF/SCCT/ACR/AHA/ASE/ASNC/NASCI/SCAI/SCMR/ 2010 Appropriate use Criteria for Cardiac Computed Tomography", A report of the American College of Cardiology Foundation Appropriate Use Criteria Task Force, the Society of Cardiovascular Computed Tomography, the. J Am Coll Cardiol. 2010;56(22):1864-1894. doi:10.1016/j.jacc.2010.07.005, 34 pages.

Vigneault, et al., "Ω-Net (Omega-Net): Fully automatic, multi-view cardiac MR detection, orientation, and segmentation with deep neural networks", Med Image Anal. 2018;48:95-106. doi:10.1016/j.media.2018.05.008, 31 pages.

Wesarg, et al., "AHA conform visualization of conventionally acquired cardiac CT data using the toolkits itk and vtk", Int Congr Ser. 2004;1268:1096-1101. doi:10.1016/j.ics.2004.03.322, 6 pages.

Wilcoxon, Frank, "Probability Tables for Individual Comparisons by Ranking Methods", Biometrics. 1947;3(3):119. doi:10.2307/3001946, 4 pages.

(56)     References Cited

OTHER PUBLICATIONS

Yamashita, et al., "Convolutional neural networks: an overview and application in radiology", Insights Imaging. 2018;9(4):611-629. doi:10.1007/s13244-018-0639-9, 19 pages.

Yancy, et al., "2017 ACC/AHA/HFSA Focused Update of the 2013 ACCF/AHA Guideline for the Management of Heart Failure: A Report of the American College of Cardiology/American Heart Association Task Force on Clinical Practice Guidelines and the Heart Failure Society of Amer", Circulation. 2017; 136(6):e137-e161. doi:10.1161/CIR.0000000000000509, 25 pages.

Yushkevich, et al., "User-guided 3D active contour segmentation of anatomical structures: Significantly improved efficiency and reliability", Neuroimage. 2006;31(3):1116-1128. doi:10.1016/j.neuroimage.2006.01.015, 13 pages.

* cited by examiner

2CH plane
3CH plane
4CH plane

DEEP LEARNING CARDIAC SEGMENTATION AND MOTION VISUALIZATION

CROSS-REFERENCE TO RELATED APPLICATION

This patent document claims priority to and benefits of U.S. Provisional Patent Application No. 63/054,196 filed on 20 Jul. 2020. The entire content of this patent application is incorporated by reference as part of the disclosure of this patent document.

GOVERNMENT LICENSE RIGHTS

This invention was made with government support under HL143113 awarded by the National Institutes of Health. The government has certain rights in the invention.

SUMMARY

This patent document describes devices, systems, and methods for automated segmentation and slicing of cardiac computed tomography (CT) images. The embodiments described herein can streamline core-lab imaging assessment in clinical trials, improve accuracy of serial imaging assessment, include other structures (i.e. right ventricle/atrium), and extend to other volumetric acquisitions such as 3D magnetic resonance imaging.

In an example, a method for automated segmentation and slicing of cardiac computed tomography (CT) images is disclosed. The method includes receiving a first plurality of input image frames associated with a cardiac CT operation, each of the first plurality of input image frames comprising a representation of two or more chambers of a heart, and performing, using a convolutional neural network (CNN), a segmentation operation and a re-slicing operation on each of the first plurality of input image frames to generate each of a plurality of output image frames comprising results of the segmentation operation and the re-slicing operation, wherein the segmentation operation comprises identifying volumes of each of the two or more chambers of the heart based on blood volumes, and wherein the re-slicing operation comprises identifying one or more features of the heart in at least one predefined plane in a coordinate system associated with the cardiac CT operation.

In another example, the above-described method may be implemented by an apparatus or device that comprises a processor and/or memory.

In yet another example, this method may be embodied in the form of processor-executable instructions and stored on a computer-readable program medium.

The subject matter described in this patent document can be implemented in specific ways that provide one or more of the following features.

DETAILED DESCRIPTION

Figure 1A:
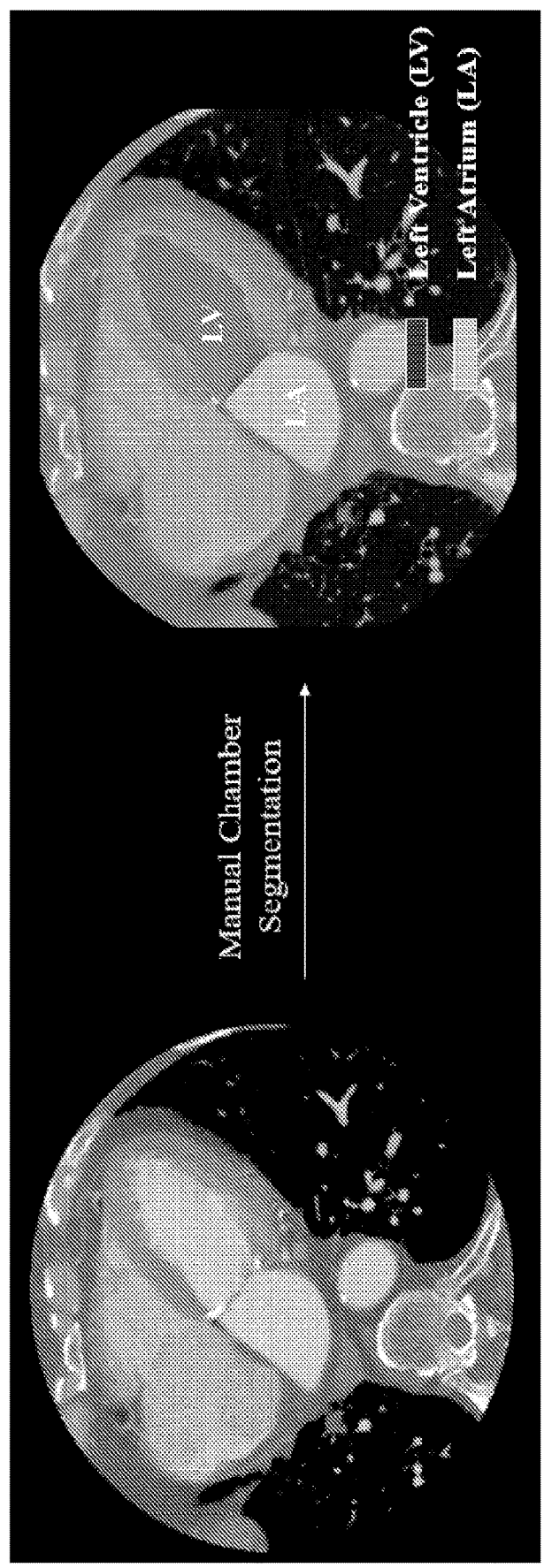
FIGS. 1A and 1B illustrate examples of manual segmentation and slicing.

Although mechanical circulatory support is required by a large percentage of patients who undergo heart transplant and serves as a destination therapy for end-stage heart failure patients who are ineligible for transplant, clinicians are currently unable to predict which patients will develop right heart failure after receiving left ventricular assist devices (LVADs). Cardiac computed tomography (CT) can be used to provide accurate morpho-functional visualization of the heart. The cardiac CT provides a non-invasive, fast and reproducible assessment of both cardiac anatomy and cardiac function. While qualitative morpho-functional assessment is possible by reviewing phases of the cardiac cycle in a cine loop, quantitative assessment requires accurate segmentation, often requiring manual annotation of the images. Further, as images are acquired volumetrically, visualization of wall motion abnormalities requires generating standard imaging planes such as multiple long-axis (LAX) planes and one short-axis (SAX) stack. Currently, this requires specialized viewing software and manual processing which may lead to inter-reader variability, limiting clinical use.

Embodiments of the disclosed technology leverage deep learning (DL) techniques for automatic and reproducible chamber segmentation and plane re-slicing from volumetrically acquired CT data. In an example, post-LVAD right heart function can be predicted and is thus useful for the identification of patients who are likely to develop right ventricular failure, allowing clinicians to provide early biventricular assistance to patients.

Section headings are used in the present document to improve readability of the description and do not in any way limit the discussion or embodiments (and/or implementations) to the respective sections only.

Introduction

The accurate and reproducible morpho-functional assessment of the left ventricle (LV) is of crucial importance in cardiovascular medicine: LV volumes and ejection fraction (EF) are critical parameters in the diagnosis, clinical management, and follow-up. LV parameters are included in clinical guidelines and adopted as inclusion criteria and endpoints in clinical trials. In addition, the left atrium (LA) provides an important contribution to cardiac function, modulating LV filling and cardiovascular performance. The standardized assessment of cardiac morphology and wall motion abnormalities is also important for the evaluation of cardiac disease.

Cardiac computed tomography (CT) provides non-invasive assessment of anatomical structures and is increasingly available as a safe alternative when echocardiography is unreliable or cardiac magnetic resonance (CMR) is contraindicated. However, CT-based, quantitative assessment of cardiac function requires the accurate segmentation of chamber volumes which is often manually obtained. Furthermore, regional visualization of LV wall motion abnormalities relies on standard cardiac imaging planes to provide accurate morphological representation. Currently, semi-automated segmentation of heart chambers and plane re-slicing leads to interobserver variability and requires extensive physician interaction.

Leveraging the recent advances of deep learning (DL) in medical imaging, embodiments of the disclosed technology provide fast, automatic and reproducible methods to comprehensively assess left-sided heart chamber volumes and function as well as provide standardized planes in cardiac CT. The described methods, systems, and devices are based on deep learning approaches to automate multi-chamber segmentation and long- and short-axis plane re-slicing of cardiac CT images. That is, the described embodiments are configured to perform segmentation and determine standard imaging planes, which advantageously increases clinical utility and reproducibility by avoiding the need for manual interaction.

Methodology

Study Population. Electrocardiogram (ECG)-gated contrast enhanced, cardiac CT scans with high LV blood volume enhancement (median HU=495 for the LV, median HU=541 for the LA) in 100 patients (60 male (age: 67±16), 40 female (age 69±18)) were collected from two institutions (67 UCSD, 33 NIH Clinical Center) performed with 3 different CT systems (41 GE Revolution, 47 Toshiba AquilionONE, and 12 Siemens SOMATOM Force). Patients were being evaluated for transcatheter aortic valve replacement (TAVR, n=39), suspicion of coronary artery disease (CAD)/stenosis (n=38), and pulmonary vein ablation (PVA, n=23). Each study had images reconstructed across an entire cardiac cycle and semi-automated segmentation of blood volumes (see below) was performed as part of ongoing research studies. These 100 patient studies served as the training samples of the DL model.

Figure 1B:
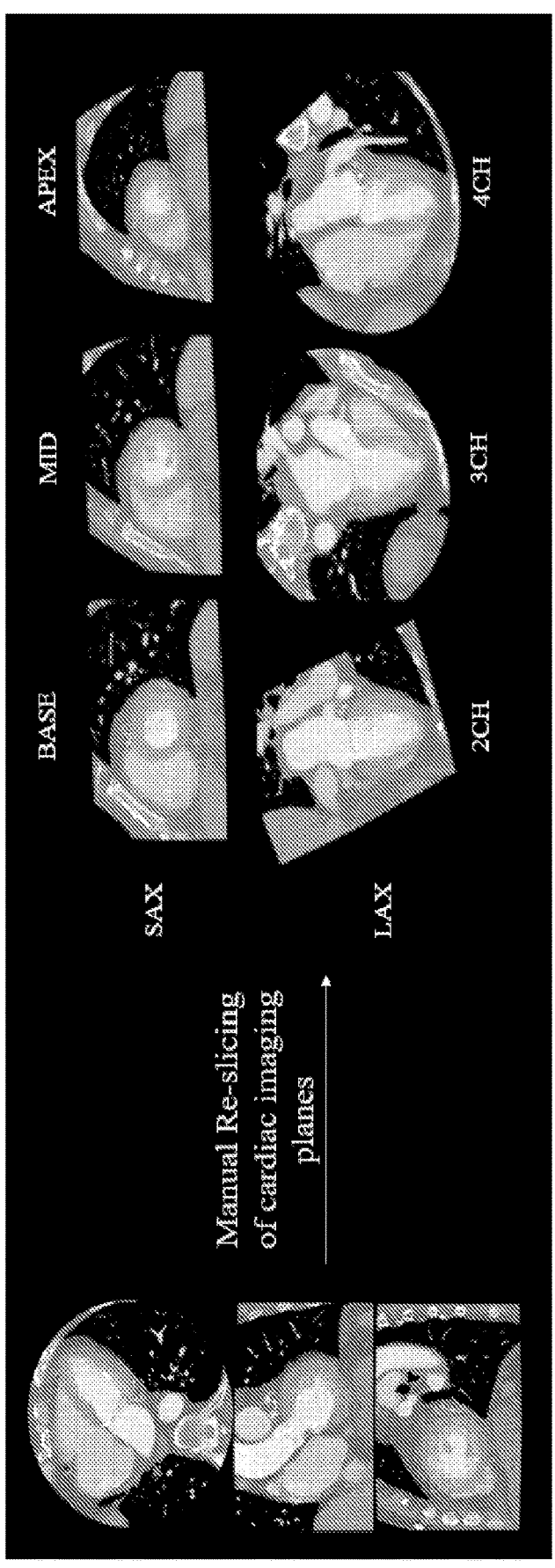

Segmentation. Left heart anatomical blood volumes including the LV and LA were segmented in a semi-automated fashion at both end-diastolic (ED) and end-systolic (ES) timeframes in all 100 studies using ITK-SNAP (Philadelphia, PA USA). A typical example of manual segmentation $S_m$ is illustrated in FIG. 1A, and a typical example of manual slicing is illustrated in FIG. 1B.

Expert-defined short- and long-axis imaging planes. A multi-imaging certified expert cardiologist manually defined three long-axis (LAX) planes (two-chamber plane $2CH_m$, three-chamber plane $3CH_m$ and four-chamber plane $4CH_m$) and one short-axis (SAX) plane at the level of the mitral valve ($MV_m$) following planning standardized guidelines. Subscript m represents manual annotation.

A stack of short-axis slices ($SAX_m$) was re-sliced at equally spaced intervals (8 mm) parallel to the manually defined MV plane. The beginning and end of the stack was defined using the manual segmentation $S_m$ of LV cavity, which ensured full LV coverage.

Extraction of plane parameters for DL prediction. From each expert-defined plane ($2CH_m$, $3CH_m$, $4CH_m$, $SAX_m$), three plane-specific vectors were extracted: one translation vector and two direction vectors. The translation vector $\vec{t}_m$ measured the spatial position of the plane's center as the difference between the center of the plane and the center of the CT volume. The x-direction vector $\vec{x}_m$ and y-direction vector $\vec{y}_m$ represented the orientation of the plane's axis in the CT volume's coordinate system.

Figure 2A:
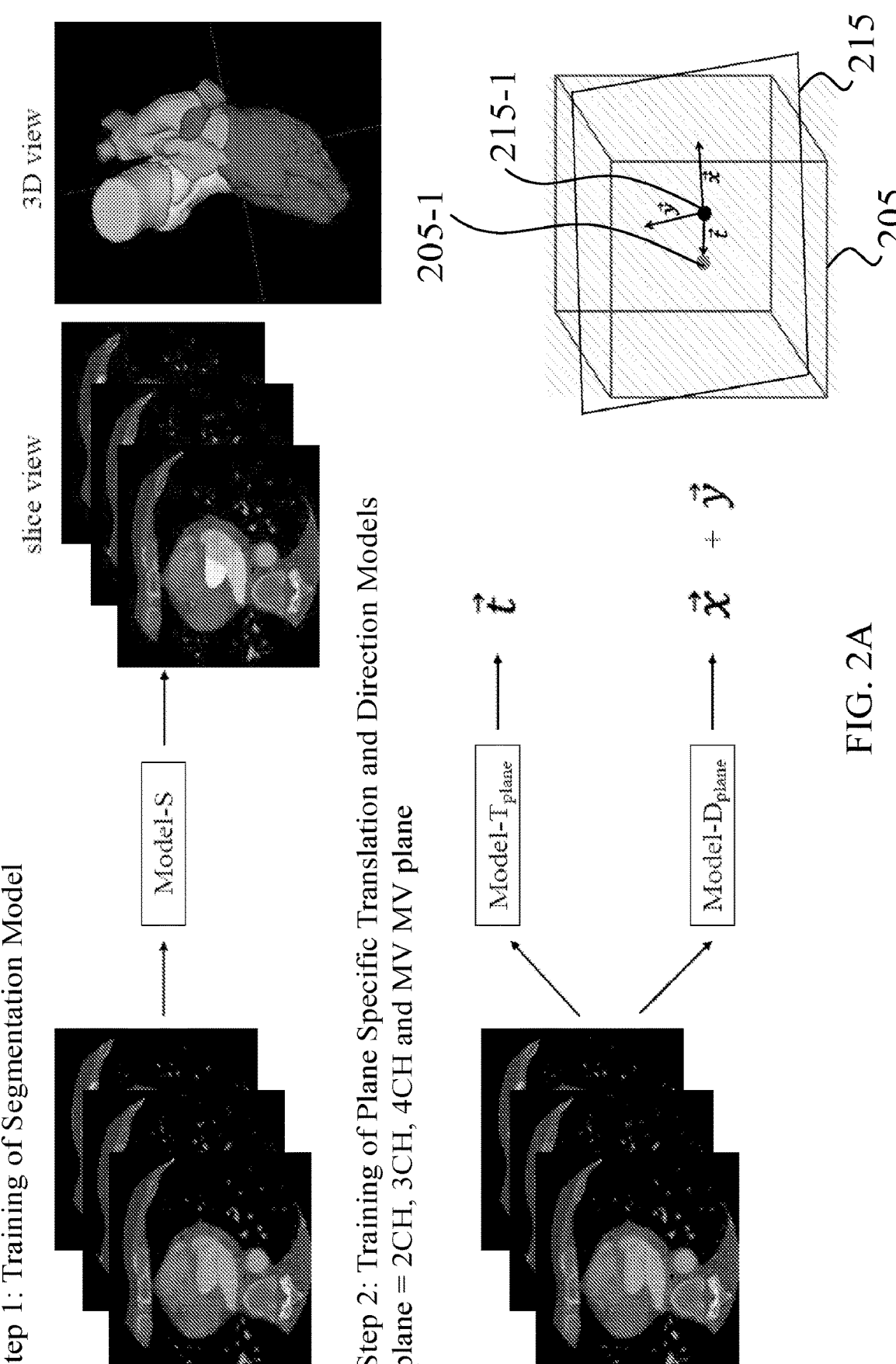
FIG. 2A illustrates operations in an example embodiment for automatic anatomical segmentation and visualization.
Figure 2B:
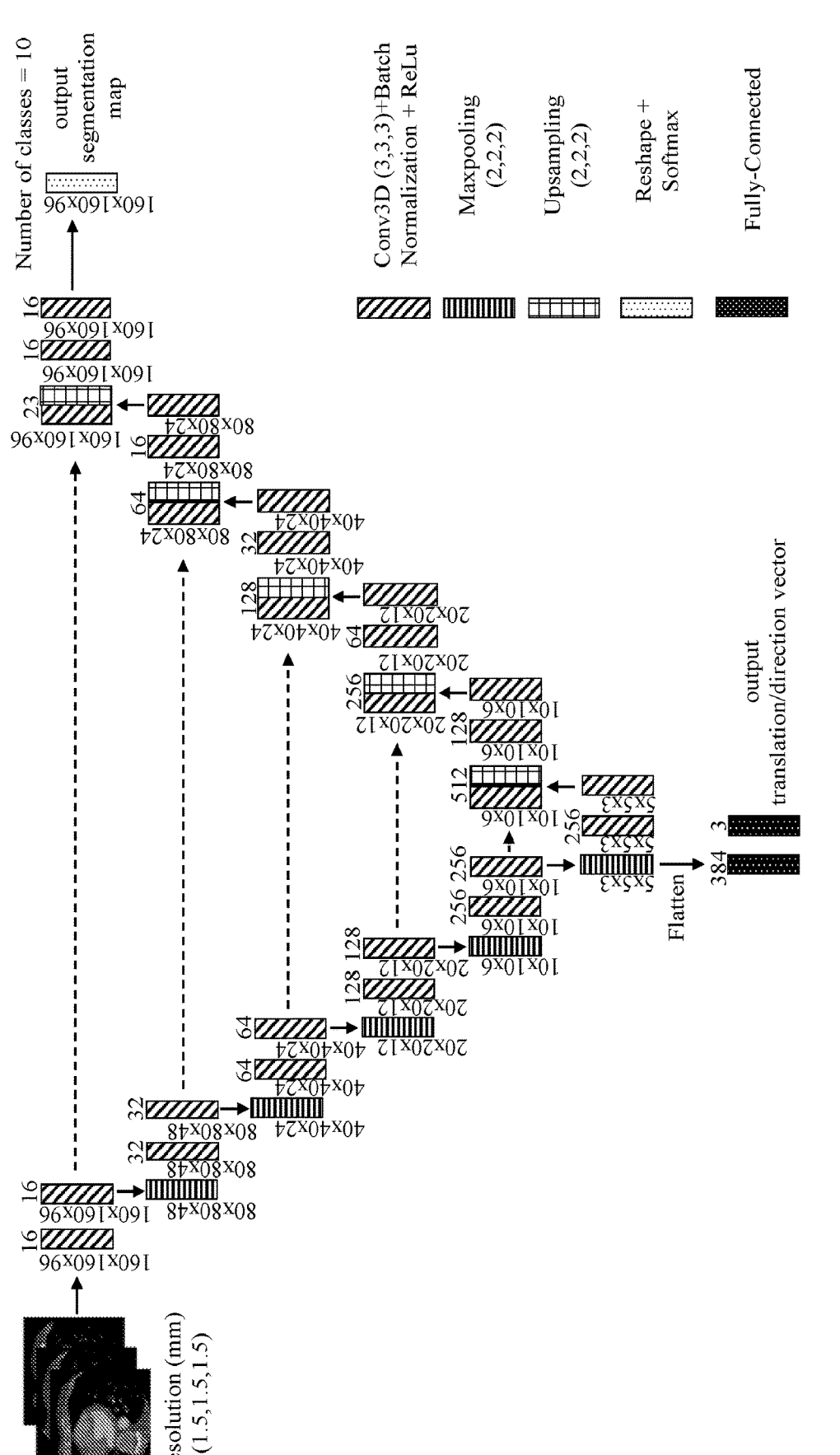
FIG. 2B illustrates an example of a neural network architecture embodiment.

Model training. FIG. 2A illustrates an example embodiment of the methods for automatic segmentation and visualization described herein, and FIG. 2B illustrates an example of the U-Net convolutional neural network (CNN) architecture used in FIG. 2A.

In this example, the modified U-Net CNN was trained using manual segmentations and plane-specific vectors derived from expert-defined planes. The model inputs were images at end-diastole or end-systole resampled to 1.5 mm isotropic spatial resolution. In step 1, a segmentation model "Model-S" is trained to predict labeled blood volumes, e.g., LV and LA segmentations, as illustrated in FIG. 1A. In some embodiments, "Model-S" serves as the initialization for the training of subsequent cardiac plane models. In step 2, "Model-$T_{plae}$" is trained to predict the translation vector $\vec{t}_{DL}$ and "Model-$D_{plae}$" is trained to predict two direction vectors $\vec{x}_{DL}$ and $\vec{y}_{DL}$. In this example, each plane (2CH, 3CH, 4CH, and MV) can be trained individually, which results in 4 translation-vector models and 4 direction-vector models, and independent prediction of planes.

FIG. 2A also illustrates the three vectors (translation vector $\vec{t}_{DL}$ and direction vectors $\vec{x}_{DL}$ and $\vec{y}_{DL}$) in relation to the image volume. The cube 205 represents the computed tomography volume with the re-sliced plane 215. The dot 205-1 is the center of volume 205 and the dot 215-1 is the center of plane 215. The translation vector $\vec{t}_{DL}$ is the displacement between the dot 205-1 and the dot 215-1. The $\vec{x}_{DL}$ and $\vec{y}_{DL}$ are directional vectors of the 2D plane 215 in the coordinate system of the cube (or volume) 205, which defines the orientation of slice.

In the embodiments described above, the orientation of the slice may be determined using two directional vectors. In other embodiments, the orientation can be determined using a normal vectors. In yet other embodiments, the orientation can be determined using three points on the slice. Embodiments described herein perform pixel-wise segmentation and simultaneously provide an orientation for imaging planes.

FIG. 2B illustrates an example of the modified U-Net neural network architecture for Model-S, Model-$T_{plane}$ and Model-$D_{plane}$. As illustrated therein, the input is a 3D image volume (at 1.5 mm isotropic voxel size) for blood volume segmentation and image plane re-slicing, and the outputs include the segmentation and the three vectors (translation vector $\vec{t}_{DL}$ and direction vectors $\vec{x}_{DL}$ and $\vec{y}_{DL}$).

The example architecture illustrated in FIG. 2B includes a down-sampling and an up-sampling part of five levels, wherein each level has two convolution layers with filters ranging from 16 to 256 from top to bottom correspondingly. All filters have a size of (3×3×3), and the all max-pooling and up-sampling have a size of (2×2×2). After the most down-sampled layer, a series of fully connected layers were inserted as the branch to output the plane-specific vectors. After the last convolutional layer in the up-sampling part, a SoftMax layer was applied to output 10 classes corresponding to nine anatomical structures (LV, LA, LAA, LVOT, aorta and 4 pulmonary veins) and the background. Training was performed with Adam optimizer, categorical crossentropy as the loss function for segmentation, mean-square-error as the loss function for translation vector and cosine proximity as the loss for direction vectors. Notice that Model-S, Model-$T_{plane}$ and Model-$D_{plane}$ had the same architecture, and the difference was the loss weight ratio set in the training process of each model as follows: segmentation: $\vec{t}:\vec{x}:\vec{y}$=1:0:0:0 for Model-S, =1:1:0:0 for Model-$T_{plane}$ and =1:0:1:1 for Model-$D_{plane}$.

The modified U-Net neural network architecture includes the down-sampling, which is used for both segmentation and slicing. As shown in FIG. 2B, at the end of the down-sampling operation, the translation vector ($\vec{t}_{DL}$) and directional vectors ($\vec{x}_{DL}$ and $\vec{y}_{DL}$) are determined. Some weights in the down-sampling operation are leveraged for the up-sampling operation, at the end of which the segmentation results are output. This modified architecture advantageously enables the described embodiments to automatically perform multi-chamber volumetric assessments and generate standardized cardiac imaging planes from CT images.

In the example illustrated in FIG. 2B, the standard U-Net architecture has been modified in at least the following two ways: (i) 3D convolution, max-pooling, and up-sampling layers were utilized to accommodate 3D CT image volumes as the input and (ii) a fully connected layer was added after the last max-pooling layer in the down-sampling path to regress the plane vectors.

Training and validation were performed using 5-fold cross-validation with random shuffling for robust unbiased evaluation. As a result, each model was trained on 80 studies (160 volumes) and evaluated on 20 validation studies (40 volumes).

Model Evaluation. Model-S predicted the segmentation volume $S_{DL}$, and Model-$T_{plane}$ and Model-$D_{plane}$ predicted plane-specific vectors $\vec{t}_{DL}$, $\vec{x}_{DL}$ and $\vec{y}_{DL}$. Planes $P_{DL}$ ($2CH_{DL}$, $3CH_{DL}$, $4CH_{DL}$, and $MV_{DL}$) were generated from the predicted plane-specific vectors. The predicted SAX stack ($SAX_{DL}$) was derived from $MV_{DL}$ and the predicted segmentation of LV.

The segmentation accuracy of Model-S prediction $S_{DL}$ was evaluated using the Dice coefficient (a volumetric metric) and Hausdorff distance (a surface-based metric). The Dice coefficient is defined as $2(|Vmanual \cap VDL|)/(|Vmanual+VDL)$ and measures the overlap between manual and DL segmentation. The Hausdorff distance measures the local maximum distance between two surfaces $S_{manual}$ and $S_{DL}$. Differences in segmentation accuracy between CT vendors and between different clinical indications were evaluated using one-way analysis of variance (ANOVA) for Dice scores.

The accuracy of planes predicted by Model-$T_{plane}$ and Model-$D_{plane}$ were evaluated by the displacement error of the center $\Delta d$, tilt error $\Delta\theta_{tilt}$ and rotation error $\Delta\theta_{rotate}$.

In some embodiments, the predicted "plane-specific" vectors were evaluated against the vectors derived from expert-defined planes using the following methods. The displacement error between expert-defined and predicted planes (e.g. $3CH_m$ vs $3CH_{DL}$) was evaluated by measurement of the Euclidean distance between the plane centers $$\Delta d = \sqrt{\sum_{i=1}^{3}\left(t_{m,i} - t_{DL,i}\right)^2}.$$

The tilt error between plane orientations was evaluated by calculating the angular distance $\Delta\theta_{tilt}$ between the expert-defined normal vector $\vec{n}_m$ to the predict normal vector $\vec{n}_{DL}$ using $\Delta\theta_{tilt}=\cos^{-1}((\vec{n}_m \cdot \vec{n}_{DL})/(\|\vec{n}_m\| \times \|\vec{n}_{DL}\|))$ and the rotation error of the plane was calculated by measuring the angular distance $\Delta\theta_{rotate}$ between $\vec{x}_m$ and $\vec{x}_{DL}$ after projection of $\vec{x}_{DL}$ onto the expert-defined plane.

Figure 3A:
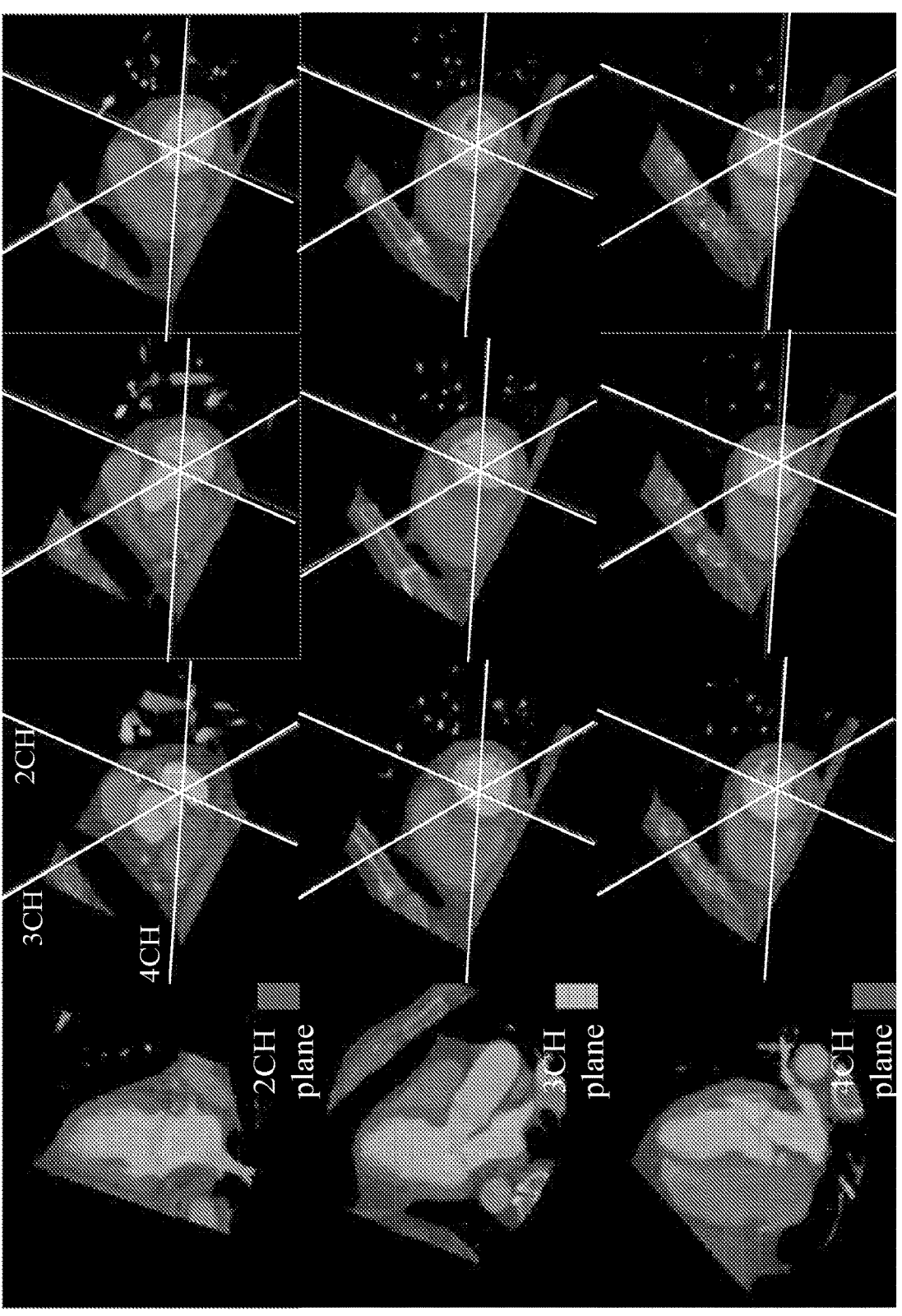
FIGS. 3A, 3B and 3C illustrate examples of images provided to a cardiologist for visual assessment.

Expert visual assessment evaluated (a) the intra-observer reproducibility of manual plane re-slicing and (b) the acceptability of $P_{DL}$ in clinical use. Expert-defined planes $P_m$ and predicted planes $P_{DL}$ were assessed in a blinded fashion one month after manual annotation. An example of the images provided for visual assessment can be found in FIGS. 3A and 3B. Each case was then scored as optimal, adequate or inadequate.

In an example, the planes were visually assessed by an expert multi-imaging cardiologist with level 3 board certifications in cardiac CT and cardiac magnetic resonance (CMR) according to the American and European societies of Cardiovascular CT and CMR. The overall quality of all included acquisitions was defined adequate. The visual plane assessment was performed blinded from source (DL-predicted or manual) by randomly assessing unlabeled planes at least one month after initial evaluation. For long axis planes, optimal quality was defined when planes had optimal anatomical view and planes were cutting through the correct anatomical myocardial walls in the short axis view; adequate quality was defined when planes had minor issues not clinically impacting anatomical assessment and planes were cutting through the correct anatomical walls. Inadequate quality was defined when planes had either major anatomical visualization issues or planes were not cutting through the appropriate myocardial walls. For the short axis plane, quality was defined either optimal if basal mitral plane was correctly angulated for LV assessment and allowed full inclusion of ventricular volume or inadequate if one of the two criteria was not fulfilled.

Figure 3C:
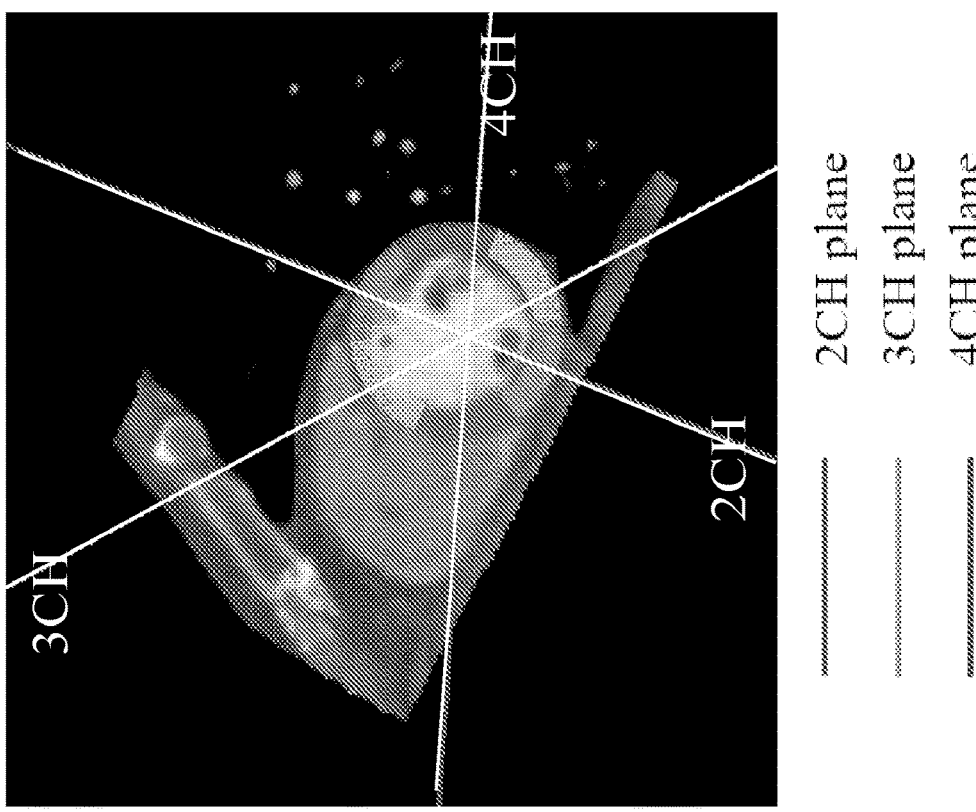
Figure 3B:
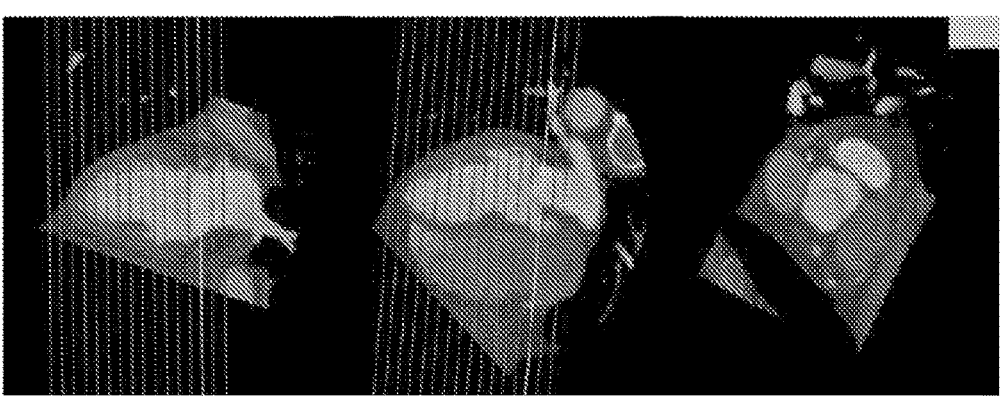
Figures 4A, 4B, 4C, 4D:
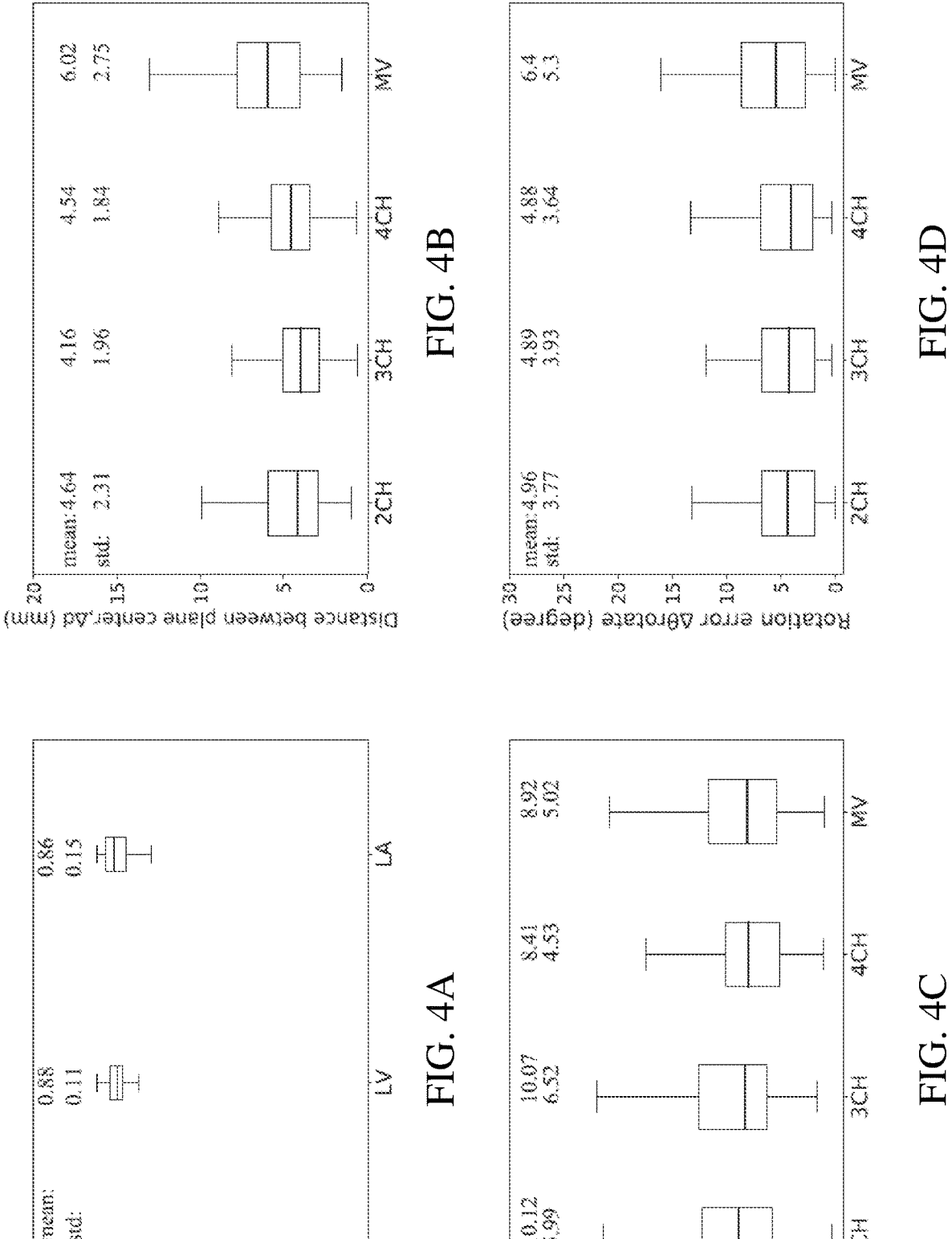
FIGS. 4A-4D illustrate examples of the quantitative evaluation of segmentation and plane-specific vector accuracy.

Lastly, anatomical coverage of $P_{DL}$ and $P_m$ was objectively quantified through the AHA 17-segment model. The percentage of cases in which the LAX planes correctly bisected the associated AHA segments was measured across all patients at the mid-ventricular slice using 6 AHA segments defined by the expert (as illustrated in FIG. 3C).

Statistical Analysis. Data are mean±standard deviation. Mean Dice similarity coefficient was calculated across all 100 patient studies for segmentations of the LV and LA. Pearson correlation and two-tailed Student's t-test were used to evaluate the agreement between EF estimates derived from $S_m$ and $S_{DL}$. The displacement error of the center $\Delta d$, tilt error $\Delta\theta_{tilt}$ and rotation error $\Delta\theta_{rotate}$ were evaluated by calculating median and quantiles reported by the box plots in FIGS. 4A-4D.

For expert visual assessment, the Wilcoxon signed-rank test was performed for each plane to analyze whether expert-defined planes and DL-predicted planes had statistical difference in assessment score distribution. For objective AHA wall segment visualization assessment, two-tailed z-test for categorical variables was used to evaluate whether the expert-defined planes and DL-predicted planes had statistical difference in proportion of cases with the correct AHA segment visualization. Statistical significance was set at a $p\leq0.05$. Analyses were performed in Python version 3.6 with scipy (version 1.1.0).

Results

Figure 5B:
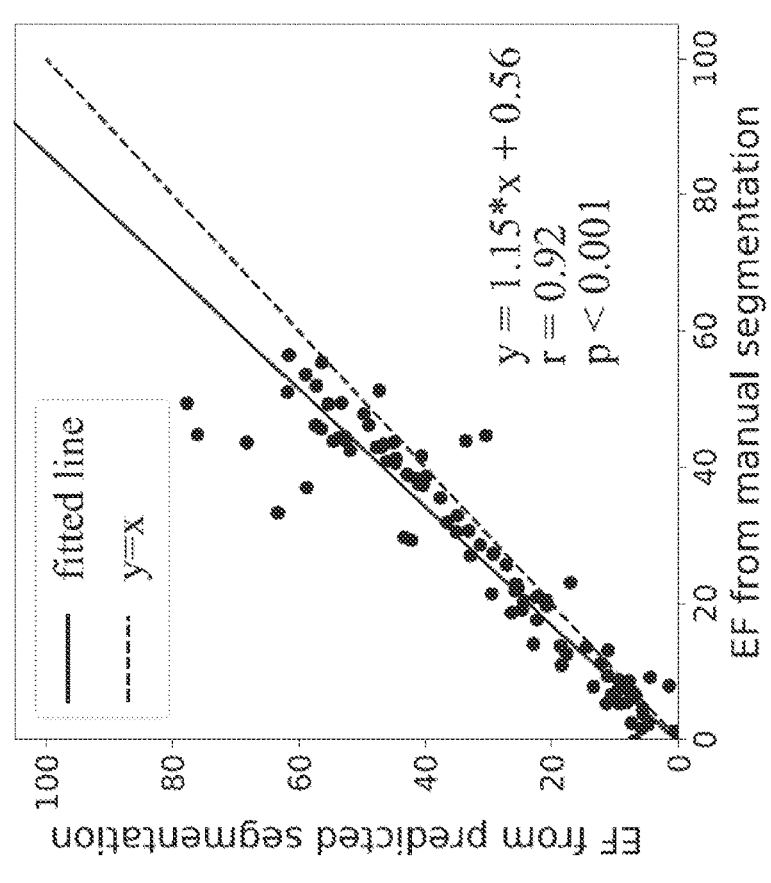
FIGS. 5A and 5B illustrate examples of the correlation between ejection fraction (EF) derived from Model-S predicted segmentation volumes ($S_{DL}$) and manual segmentation volumes ($S_m$), respectively.
Figure 5A:
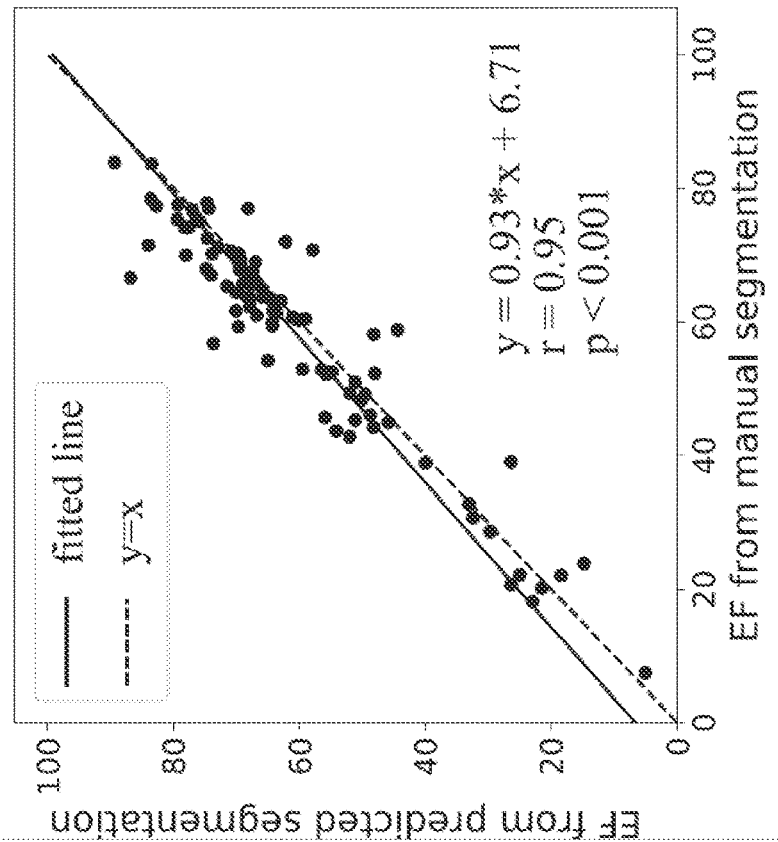
Figure 6:
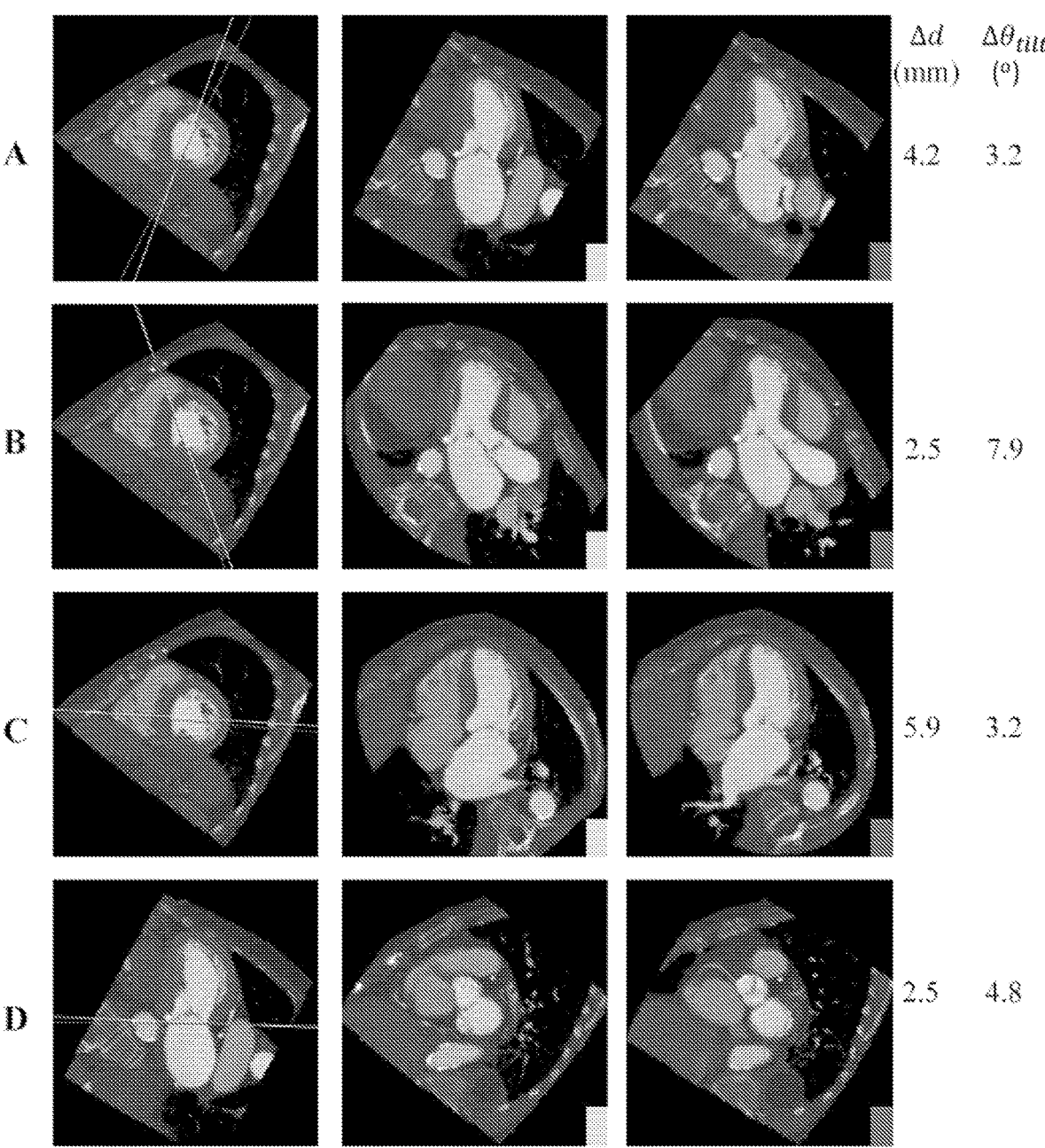
FIG. 6 illustrates an example of the agreement between expert-defined and deep learning (DL)-predicted planes.
Figure 7:
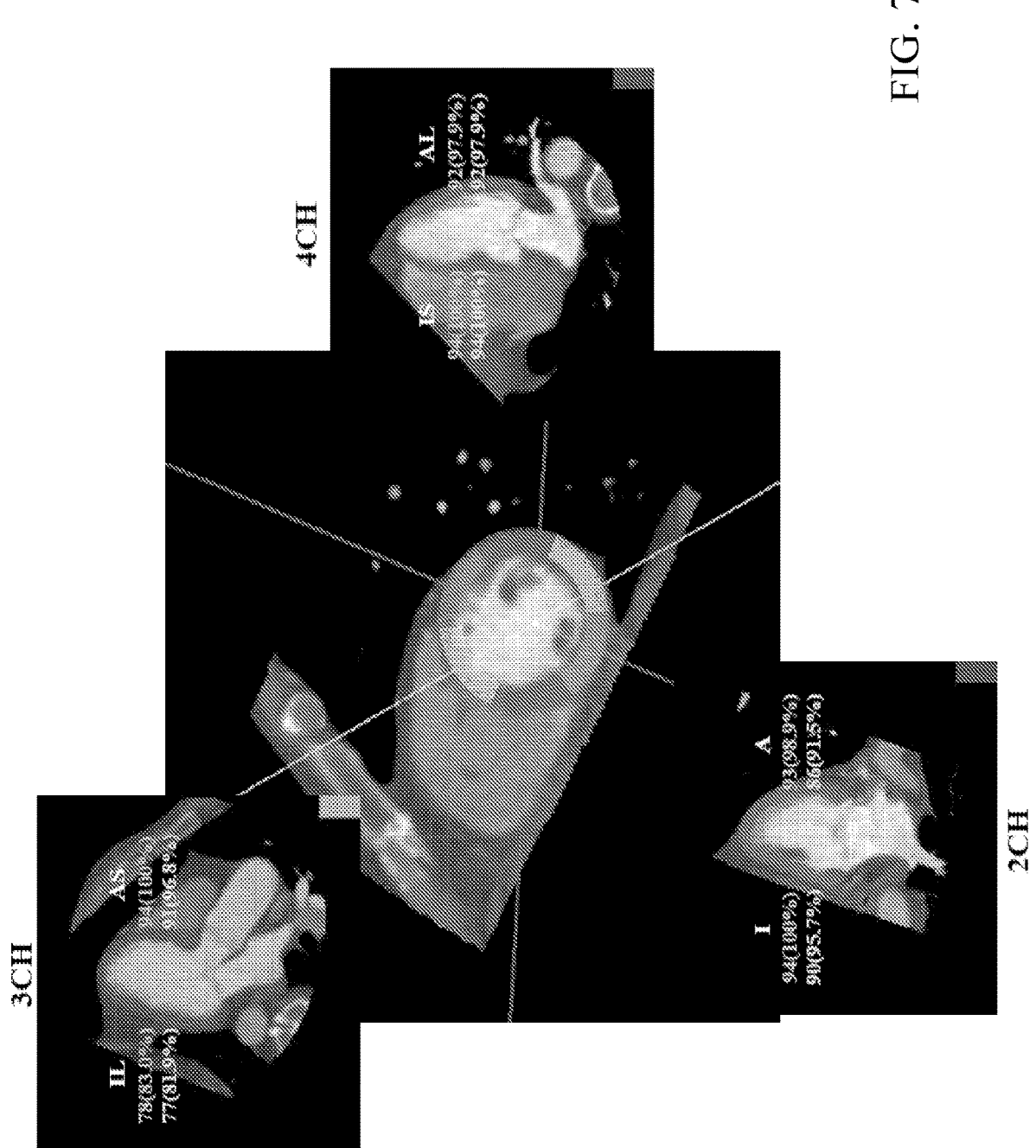
FIG. 7 illustrates an example of American Heart Association (AHA) segment visualization.

Segmentation Performance. FIG. 5A illustrates the accuracy of the DL-predicted segmentation $S_{DL}$ compared to the manual segmentation $S_m$. DL-predicted segmentations had median Dice coefficients of 0.907 (IQR: 0.884, 0.932) and 0.931 (IQR: 0.913, 0.954), and median Hausdorff distances of 6.2 mm (IQR: 3.7, 8.2) and 7.3 mm (IQR: 5.6, 9.6) for the LV and LA, respectively. There were no statistically significant differences (p>0.05) in Dice across vendors but Dice in the LA did vary with respect to clinical indications (p=0.001) on ANOVA testing. There was close agreement in LV EF (Pearson correlation r=0.95, p=0.49) as well as between LA EF (r=0.92, p=0.29) (FIG. 6).

Plane Re-Slicing Performance. FIG. 6 illustrates the close agreement in slice planning. The median displacement error Δd between Plane$_m$ and Plane$_{DL}$ was 7.0 mm (IQR: 5.0, 9.5) across all planes, 6.3 mm (IQR: 4.3, 8.5) for 2CH, 6.2 mm (IQR: 4.3, 8, 8) for 3 CH, 7.2 mm (IQR: 5.5, 9.6) for 4CH and 7.6 mm (IQR: 5.3, 11.0) for MV (e.g., FIG. 4B). The tilt error Δθ$_{tilt}$ between planes was 8.0° (IQR: 5.0, 11.7) across all planes, 9.5° (IQR: 6.0, 13.9) for 2CH, 8.3° (IQR: 4.8, 13.0) for 3 CH, 7.2° (IQR: 4.6, 11.2) for 4CH and 7.5° (IQR: 4.8, 9.4) for M (e.g., FIG. 4C).

Intra and Inter-reader Differences in Imaging Plane Vectors. Table 1 shows that the DL-reader orientation differences Δθ were not significantly different (p>0.05) compared with the corresponding inter- and intra-reader difference. In terms of displacement differences Δd, the 3CH and 4CH DL-reader1 difference was significantly smaller (p<0.05) than the intra-reader difference.

Intra-reader 1 differences represent variation in planes planned by the same reader six months apart. Given that the DL approach was trained on slice planning by reader 1, DL-reader 1 differences were compared to intra-reader1 differences. Inter-reader variation captures variation in slice planning by two different readers. DL-reader2 differences were compared to inter-reader values. Differences were reported as median (IQR). * indicates a significant difference (p<0.05).

adequate imaging planes for a large percentage (≥94%) of cases across all slice plane locations. Herein, Plane$_m$=plane manually resliced, and Plane$_{DL}$=plane predicted by DL model.

TABLE 2

Diagnostic Adequacy of Manual and Deep-Learning Imaging Planes as Scored by Cardiothoracic Imaging Expert

|  | Plane$_m$ | Plane$_{DL}$ |
| --- | --- | --- |
| 2CH | 100% | 100% |
| 3CH | 100% | 94% |
| 4CH | 100% | 98% |
| SAX | 100% | 100% |

Quantitative assessment of slice position via AHA wall assessment. Table 3 shows that the proportion of cases with correct AHA segment inclusion was not significantly different between Planem and PlaneDL for all AHA walls (two-sided z test, p>0.05) except anterior wall which had a lower likelihood of being visualized by the 2CH plane (p=0.02). The percentage of cases in which the LAX plane correctly intersects corresponding AHA wall is shown. Significant p-values are shown by asterisk.

TABLE 3

Assessment of AHA Wall Visualization for Manual and DL-based Cardiac Planes

|  |  | Plane$_m$ | Plane$_{DL}$ | p value |
| --- | --- | --- | --- | --- |
| 2CH | Inferior | 100% | 97% | 0.08 |
|  | Anterior | 99% | 92% | 0.02* |
| 3CH | Inferolateral | 84% | 84% | 1 |
|  | Anteroseptal | 100% | 97% | 0.08 |
| 4CH | Inferoseptal | 100% | 97% | 0.08 |
|  | Anterolateral | 98% | 97% | 0.65 |

Run-time for DL-based Approach. Each model was trained for 50 epochs with each epoch using approxi-

TABLE 1

Comparison of LAX Plane Location and Angulation Differences between Readers and Deep Learning

|  |  | Intra-Reader 1 Difference | DL-Reader 1 Difference | p-value | Inter-Reader difference | DL-Reader 2 Difference | p-value |
| --- | --- | --- | --- | --- | --- | --- | --- |
| 2CH | Δd (mm) | 8.3 (7.3, 13.3) | 5.9 (5.0, 7.0) | 0.20 | 14.4 (7.1, 21.8) | 13.4 (7.9, 20.0) | 0.91 |
|  | Δθ (degree) | 7.8 (5.4, 14.1) | 7.3 (4.7, 11.2) | 0.57 | 10.6 (7.2, 11.8) | 10.9 (5.1, 14.2) | 0.75 |
| 3CH | Δd (mm) | 11.2 (8.0, 14.2) | 6.9 (6.0, 7.5)* | 0.04 | 15.3 (9.2, 18.4) | 15.5 (10.8, 18.7) | 0.76 |
|  | Δθ (degree) | 8.6 (5.7, 10.3) | 9.3 (7.7, 12.5) | 0.35 | 12.2 (11.9, 18.4) | 15.5 (11.4, 21.2) | 0.71 |
| 4CH | Δd (mm) | 15.9 (10.6, 19.5) | 6.5 (3.7, 7.5)* | 0.003 | 12.1 (8.5, 13.7) | 9.6 (9.1, 12.7) | 0.84 |
|  | Δθ (degree) | 7.3 (6.0, 10.1) | 7.0 (4.0, 8.8) | 0.35 | 10.6 (5.3, 13.4) | 11.1 (8.7, 12.9) | 0.82 |

Visual Assessment of Plane Quality. Table 2 shows that the deep-learning approach yielded diagnostically mately 170 seconds in our workstation. The time needed to predict two segmentations (ED and ES) as well as four imaging planes ($2CH_{DL}$, $3CH_{DL}$, $4CH_{DL}$, and $MV_{DL}$) was 29.7±4.0 seconds.

Assessment of the utility of DL-predicted planes on test cases. Table 4 shows that DL yielded diagnostically adequate imaging planes for a large percentage (≥99% by Reader 2 and ≥94% by Reader 3) of cases across all slice plane locations.

TABLE 4

Diagnostic Adequacy of Deep-Learning Imaging Planes in the Testing Group as Scored by Imaging Experts

|       | Reader 2 | Reader 3 |
|-------|----------|----------|
| 2CH   | 99%      | 99%      |
| 3CH   | 100%     | 94%      |
| 4CH   | 100%     | 95%      |
| SAX   | 100%     | 100%     |

Table 5 shows that there was close agreement between visual estimation of ejection fraction by readers and quantification via automated segmentation. Specifically, linear regression demonstrated strong correlation (Spearman $\rho$=0.93 and 0.95 for Reader 2 and 3, respectively). In addition, classification of EF<40%, 40-50%, and >50% with the DL approach agreed with visual prediction in 88.9% and 80.5% of cases for Reader 2 and 3, respectively.

TABLE 5

The Close Agreement of Classification of EF Between Visual Estimation by Expert Readers and Automated Quantification via DLLV Segmentation

|            |         | Reader 2 | | | Reader 3 | | |
|------------|---------|------|-------|------|------|-------|------|
|            |         | <40% | 40~50% | >50% | <40% | 40~50% | >50% |
| DL predict | <40%    | 30   | 3     | 0    | 31   | 1      | 1    |
|            | 40~50%  | 0    | 7     | 4    | 8    | 2      | 1    |
|            | >50%    | 0    | 9     | 91   | 2    | 15     | 83   |

Discussion

The DL-based approach generated segmentations with high Dice coefficient (median Dice=0.907 and 0.931 for LV and LA, respectively) and a strong linear correlation (Pearson r>0.9) with manual segmentations parameters. Furthermore, LAX and SAX planes via DL had low errors in spatial displacement and tilt, high proportion of cases were approved as optimal and adequate by an expert reader and visualized the correct AHA segment walls. These results demonstrate that the DL approach can provide reproducible, fully-automatic and comprehensive left-sided heart chamber quantification and regional LV wall observation.

Cardiac imaging planes provide more accurate morphological representation of cardiac anatomy than the axial, coronal and sagittal views of the body. For instance, the 3CH plane optimizes the visualization and assessment of mitral and aortic valves, the 4CH plane gives an overview of both chambers and regional left ventricular wall motion, and the SAX plane (and derived SAX stack) is considered as the standard approach for quantifying LV volume and function. Significant time and training are required for acquisition of these views in cardiac MR imaging and echocardiography and currently, manual re-slicing is needed for cardiac CT assessment.

Some advantages of the DL approach. Planning of cardiac planes is a difficult task to automate and requires considerable training given patient-specific variability.

Furthermore, chamber segmentation is a time-consuming process. As a result, clinical evaluation of cardiac CT images relies on specialized radiological software and extensive clinical training. This approach suggests that both visualization of the heart in canonical views as well as volumetric quantification of heart function can be obtained using a shared DL framework.

The proposed model takes approximately 1 second (on average) to predict both cardiac chamber segmentation and plane-specific vectors for each 3D CT volume of a patient study. While optimization for this prediction time is not the focus of this study, it suggests straightforward clinical translation.

Robust and automated prediction of cardiac volumes and imaging planes could be used to measure multiple important clinical parameters. In this case, the ejection fraction estimates are derived from measures of LV and LA volume. However, the availability of long-axis imaging planes enables assessment of additional measures such as global longitudinal strain and circumferential strain to be measured from the adequate predicted planes. Furthermore, labeling of the myocardium in the training data would enable measurement of LV wall thickness. However, further work is needed to evaluate the accuracy of these measures in a well-selected and representative patient cohort.

Lastly, the imaging data was obtained from multiple imaging centers and using different imaging vendors/systems, which increases the probability of this approach successfully generalizing to clinical practice.

Clinical Significance. The accurate DL-based segmentation of heart chambers can provide reliable and automatic quantification of chamber volumes and function, which may be adopted for core-lab imaging assessment in trials. The reproducible DL-based plane re-slicing offers optimal planes that can be translated into improved accuracy in LV global and regional wall motion assessment for baseline and follow-up CT scans. This DL approach can be translated to other cardiac structures such as the right ventricle and right atrium to reduce manual segmentation errors in the future. It is also promising to translate this DL approach in multi-modality such as 3D MRI to reduce the assessment bias between different modalities.

Limitations. In certain scenarios, embodiments of the disclosed technology may be susceptible to variability in the performance of predicting different planes both in terms of visual assessment and AHA segment visualization. Specifically, a greater consistency is observed between DL and the manual annotation for 4CH planes relative to 2CH and 3CH planes. Specifically, both DL-based prediction and manual annotation of 3CH planes had a lower successful rate in visualizing the inferolateral wall. This suggests that anatomical variability may be limiting the performance of the DL. Furthermore, displacement errors in the SAX images are likely of minimal clinical impact as a stack of images is used to evaluate the heart. This limits the possibility of missing anatomically relevant features due to a translation error.

Clinical Competencies. There is a rapidly growing body of evidence in support of machine-learning based tools for evaluation of medical imaging data. In this investigation, a deep learning approach has been shown to automate assessment of ECG-gated volumetric imaging by providing two critical clinical measures: cardiac volumetric estimates and regional wall motion visualization.

Translational Outlook. Further studies are needed to assess the additional clinical impact of the described approach on patient outcomes when compared to conventional manual strategies. However, the feasibility of the described methods to obtain reliable, automatic and fast results has been demonstrated. In addition, clinical impact may be facilitated by this approach's ability to provide comprehensive and reliable visualizations of both cardiac segmentations and plane locations.

Example Embodiments and Methods

Methods, systems, and devices that include a DL approach for automated cardiac multi-chamber blood volume segmentation and long-axis and short-axis plane re-slicing of CT images are described herein. The results showed high accuracy of segmentation, high adequacy of planes in expert visual assessment and high accuracy of planes in visualizing the right AHA segment walls. This deep learning approach is promising to replace time-consuming manual work in chamber segmentation and plane re-slicing and provide reproducible, fully-automatic and comprehensive left-sided heart chamber quantification and regional LV wall observation.

Figure 8:
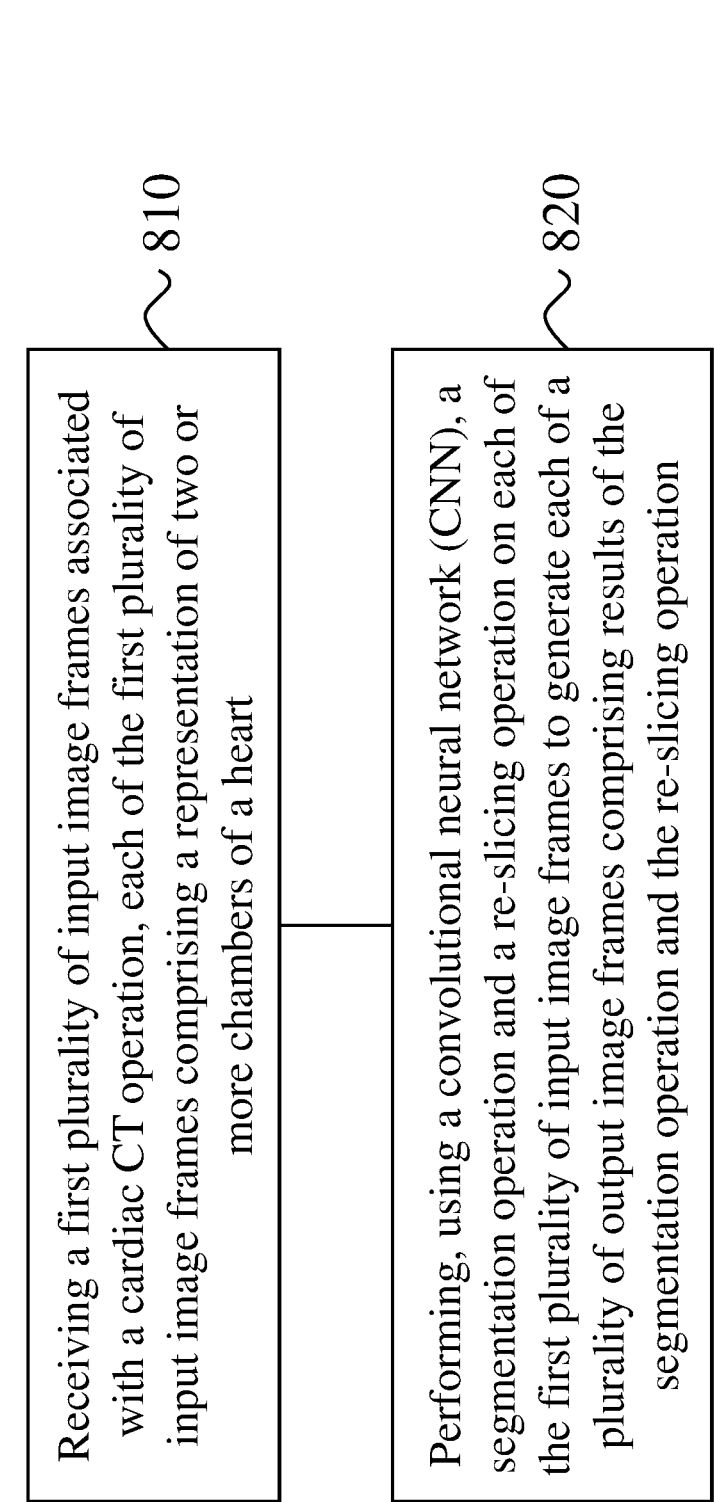
FIG. 8 illustrates a flowchart of an exemplary method for automatic anatomical segmentation and visualization.

FIG. 8 illustrates a flowchart of an exemplary method for cardiac segmentation and visualization. The method 800 includes, at operation 810, receiving a first plurality of input image frames associated with a cardiac CT operation, each of the first plurality of input image frames comprising a representation of two or more chambers of a heart.

The method 800 includes, at operation 820, performing, using a convolutional neural network (CNN), a segmentation operation and a re-slicing operation on each of the first plurality of input image frames to generate each of a plurality of output image frames comprising results of the segmentation operation and the re-slicing operation.

In some embodiments, the segmentation operation comprises identifying volumes of each of the two or more chambers of the heart based on blood volumes, and the re-slicing operation comprises identifying one or more features of the heart in at least one predefined plane in a coordinate system associated with the cardiac CT operation.

In some embodiments, the CNN is trained based on manual segmentation and manual re-slicing of a second plurality of input image frames, each of the second plurality of input image frames comprising the representation of the two or more chambers. For example, the training can be performed for segmentation (e.g., Model-S) to predict blood volumes, to predict translation vectors (e.g., Model-$T_{plane}$), and to predict the two direction vectors (e.g., model-$D_{plae}$).

In some embodiments, the method 800 further includes the operation of performing a comparison between an output image frame and a manual segmentation of a corresponding input image frame. In an example, an efficacy of the comparison is quantified based on a Dice similarity and an ejection fraction (EF). In other embodiments, an efficacy of a comparison between an output image frame and a manual re-slicing of a corresponding image frame is quantified based on errors in a plane location and a plane angle. Examples of quantifying the efficacy of the described embodiments is described in Results section above.

In some embodiments, the CNN comprises a modified U-Net architecture, as illustrated in FIG. 2B. As shown therein, the CNN comprises multiple down-sampling levels and multiple up-sampling levels. In an example, each of the multiple down-sampling and up-sampling levels comprises two fully-connected convolutional layers and a filter. In another example, the modified U-Net architecture comprises (a) three-dimensional convolution layers, max-pooling layers, and up-sampling layers that are configured to accept three-dimensional CT image volumes as inputs, and (b) a fully-connected layer connected to an output of a last max-pooling layer in a down-sampling path of the modified U-Net architecture.

In some embodiments, the modified U-Net architecture comprises a down-sampling path comprising a plurality of down-sampling steps, each of the plurality of down-sampling steps comprising multiple convolutions, a rectified linear unit, and a max-pooling operation, a fully-connected layer connected to an output of a last max-pooling operation in the down-sampling path, an up-sampling path comprising a plurality of up-sampling steps, each of the plurality of up-sampling steps comprising an up-sampling operation and multiple convolutions, and a softmax operation (which is a generalization of the logistic function to multiple dimensions) connected to an output of a last convolution in the up-sampling path, wherein an output of the re-slicing operation is generated at an output of the fully-connected layer, and wherein an output of the segmentation operation is generated at an output of the softmax operation.

In some embodiments, each of the multiple convolutions comprises a three-dimensional convolution operation.

In some embodiments, the output of the re-slicing operation comprises a translation vector and at least one of (a) two directional vectors, (b) a normal vector, or (c) three three-dimensional points.

In some embodiments, the two or more chambers of a heart comprise a left ventricle and a left atrium, and the at least one predefined plane comprises a 2CH, a 3CH, or a 4CH plane.

The described embodiments advantageously enable rapid and reproducible assessment of global function as well as regional wall motion abnormalities in patients, such as those with CAD and other cardiomyopathies who are frequently evaluated with cardiac CT. In addition, automatic slicing of standardized cardiac planes can be used for reproducible longitudinal assessment of patients undergoing serial cardiac exams and in clinical trials.

Figure 9:
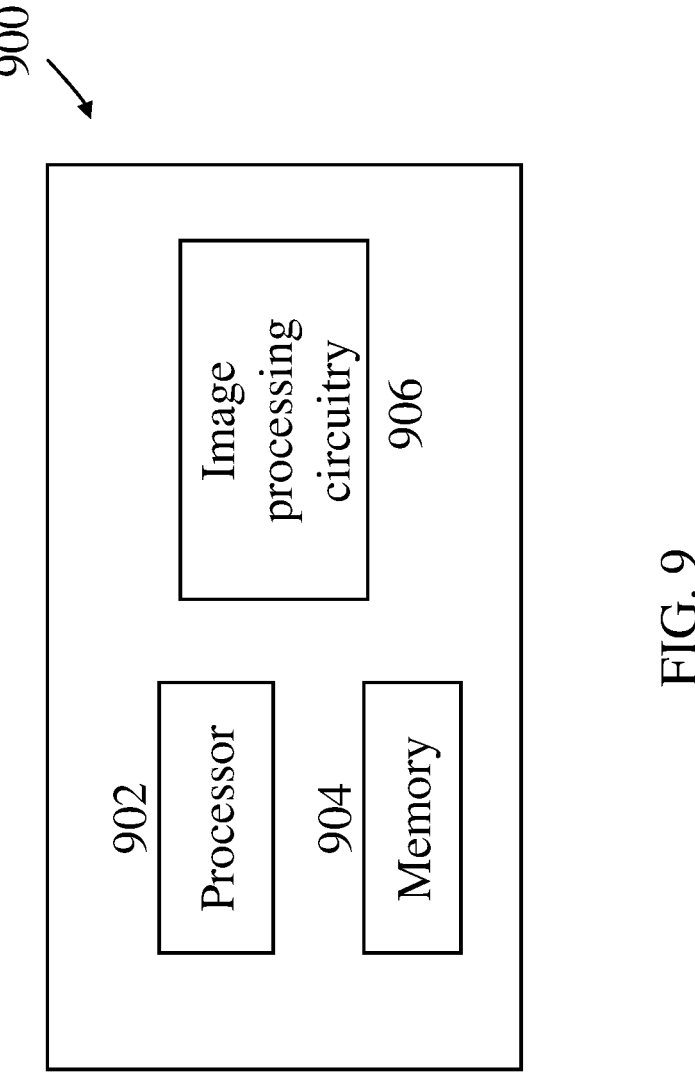
FIG. 9 is a block diagram of an example of a hardware platform for implementing the methods described in the present document.

FIG. 9 is a block diagram of an image and/or video processing apparatus 900. The apparatus 900 may be used to implement one or more of the methods described herein. The apparatus 900 may include one or more processors 902, one or more memories 904 and the deep-learning based image and/or video processing hardware 906. The processor(s) 902 may be configured to implement one or more methods (including, but not limited to, method 800) described in the present document. The memory (or memories) 904 may be used for storing data and code used for implementing the methods and techniques described herein. The deep-learning based image and/or video processing hardware 906 may be used to implement, in hardware circuitry, some techniques, algorithms or methods described in the present document.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for automated segmentation and slicing of cardiac computed tomography (CT) images, comprising:
   receiving a first plurality of input image frames associated with a cardiac CT operation, each of the first plurality of input image frames comprising a representation of two or more chambers of a heart; and
   performing, using a convolutional neural network (CNN), a segmentation operation and a re-slicing operation on each of the first plurality of input image frames to generate each of a plurality of output image frames comprising results of the segmentation operation and the re-slicing operation,
   wherein the CNN comprises a modified U-Net architecture that includes:
      a down-sampling path comprising a plurality of down-sampling steps,
      a fully-connected layer connected to an output of a last max-pooling operation in the down-sampling path, and
      an up-sampling path comprising a plurality of up-sampling steps,
   wherein the segmentation operation comprises identifying volumes of each of the two or more chambers of the heart based on blood volumes, and
   wherein the re-slicing operation comprises identifying one or more features of the heart in at least one predefined plane in a coordinate system associated with the cardiac CT operation.

2. The method of claim 1, wherein the CNN is trained based on manual segmentation and manual re-slicing of a second plurality of input image frames, each of the second plurality of input image frames comprising the representation of the two or more chambers.

3. The method of claim 1, comprising:
   performing a comparison between an output image frame and a manual segmentation of a corresponding input image frame.

4. The method of claim 3, wherein an efficacy of the comparison is quantified based on a Dice similarity and an ejection fraction (EF).

5. The method of claim 1, wherein an efficacy of a comparison between an output image frame and a manual re-slicing of a corresponding image frame is quantified based on errors in a plane location and a plane angle.

6. The method of claim 1, wherein each of the plurality of down-sampling steps and each of the plurality of up-sampling steps comprises two fully-connected convolutional layers and a filter.

7. The method of claim 1, wherein the modified U-Net architecture comprises three-dimensional convolution layers, max-pooling layers, and up-sampling layers that are configured to accept three-dimensional CT image volumes as inputs.

8. The method of claim 1, wherein:

each of the plurality of down-sampling steps comprising multiple convolutions, a rectified linear unit, and a max-pooling operation;

each of the plurality of up-sampling steps comprising an up-sampling operation and multiple convolutions; and the modified U-Net architecture further comprises a softmax operation connected to an output of a last convolution in the up-sampling path, wherein an output of the re-slicing operation is generated at an output of the fully-connected layer, and wherein an output of the segmentation operation is generated at an output of the softmax operation.

9. The method of claim 8, wherein each of the multiple convolutions comprises a three-dimensional convolution operation.

10. The method of claim 8, wherein the output of the re-slicing operation comprises a translation vector and at least one of (a) two directional vectors, (b) a normal vector, or (c) three three-dimensional points.

11. The method of claim 1, wherein the two or more chambers of a heart comprise a left ventricle and a left atrium, and wherein the at least one predefined plane comprises a 2CH plane, a 3CH plane, or a 4CH plane.

12. A medical imaging system for automated segmentation and slicing of cardiac computed tomography (CT) images, comprising:

one or more processors configured to:

receive a first plurality of input image frames associated with a cardiac CT operation, each of the first plurality of input image frames comprising a representation of two or more chambers of a heart; and perform, using a convolutional neural network (CNN), a segmentation operation and a re-slicing operation on each of the first plurality of input image frames to generate each of a plurality of output image frames comprising results of the segmentation operation and the re-slicing operation, wherein the CNN comprises a modified U-Net architecture that includes:

a down-sampling path comprising a plurality of down-sampling steps, a fully-connected layer connected to an output of a last max-pooling operation in the down-sampling path, and an up-sampling path comprising a plurality of up-sampling steps, wherein the segmentation operation comprises identifying volumes of each of the two or more chambers of the heart based on blood volumes, and wherein the re-slicing operation comprises identifying one or more features of the heart in at least one predefined plane in a coordinate system associated with the cardiac CT operation.

13. The medical imaging system of claim 12, wherein the CNN is trained based on manual segmentation and manual re-slicing of a second plurality of input image frames, each of the second plurality of input image frames comprising the representation of the two or more chambers.

14. The medical imaging system of claim 12, wherein the one or more processors are configured to:

perform a comparison between an output image frame and a manual segmentation of a corresponding input image frame.

15. The medical imaging system of claim 14, wherein an efficacy of the comparison is quantified based on a Dice similarity and an ejection fraction (EF).

16. The medical imaging system of claim 12, wherein an efficacy of a comparison between an output image frame and a manual re-slicing of a corresponding image frame is quantified based on errors in a plane location and a plane angle.

17. A non-transitory computer-readable storage medium having instructions stored thereupon for automated segmentation and slicing of cardiac computed tomography (CT) images, comprising:

instructions for receiving a first plurality of input image frames associated with a cardiac CT operation, each of the first plurality of input image frames comprising a representation of two or more chambers of a heart; and instructions for performing, using a convolutional neural network (CNN), a segmentation operation and a re-slicing operation on each of the first plurality of input image frames to generate each of a plurality of output image frames comprising results of the segmentation operation and the re-slicing operation, wherein the CNN comprises a modified U-Net architecture that includes:

a down-sampling path comprising a plurality of down-sampling steps, a fully-connected layer connected to an output of a last max-pooling operation in the down-sampling path, and an up-sampling path comprising a plurality of up-sampling steps, wherein the segmentation operation comprises identifying volumes of each of the two or more chambers of the heart based on blood volumes, and wherein the re-slicing operation comprises identifying one or more features of the heart in at least one predefined plane in a coordinate system associated with the cardiac CT operation.

* * * * *